Dec. 10, 1935.   W. C. HEDGCOCK   2,023,956
TRUCK
Filed Dec. 19, 1931   2 Sheets-Sheet 1

Inventor:
William C. Hedgcock,
By Wilkinson, Huxley, Byron & Knight
Attys.

Dec. 10, 1935.  W. C. HEDGCOCK  2,023,956
TRUCK
Filed Dec. 19, 1931  2 Sheets-Sheet 2

Inventor:
William C. Hedgcock,
By Atkinson, Huxley, Byron v. Knight
Attys.

Patented Dec. 10, 1935

2,023,956

UNITED STATES PATENT OFFICE 2,023,956

TRUCK

William C. Hedgcock, Wilmette, Ill., assignor to American Steel Foundries, Chicago, Ill., a corporation of New Jersey Application December 19, 1931, Serial No. 582,062

20 Claims. (Cl. 105—224)

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

Passenger car trucks are generally easy riding, due to the use of both coil and elliptic leaf springs in series; the coil springs responding to the light, quick shocks, the leaf springs to the slow, heavy impulses. Coil springs are quick and sensitive in response, leaf springs relatively less so, partly due to frictional work absorption between the leaves. For this reason, and also by providing coil and leaf springs of different natural vibration periods, they tend to dampen each other's synchronous vibrations without impairing free spring response. This condition is obtained by having the different springs in series. Placing leaf and coil springs in parallel is not sufficient, since they then act as a unit and have a common period of vibration.

Although the usual passenger car truck with series arrangement of coil and leaf springs gives good riding qualities, it is undesirably heavy, costly and complicated for freight service. This is partly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object of the invention is to provide a car truck wherein the spring suspension is such that springs of different character are placed in series.

Yet another object of the invention is to provide a car truck having springs of different characteristics in series and so disposed that complete duplication of carrying capacity is not required in both kinds of springs.

A further object of the invention is to provide a car truck having springs of different character which are adapted to work independently of each other whereby shocks incident to operation are adequately absorbed.

A still further object of the invention is to provide a car truck wherein the springs are arranged so that each dampens out the other's vibration.

A yet further object is to provide a truck construction wherein the spring suspension is interposed between the side frame and journal boxes whereby the unsprung weight of the truck parts is reduced to a minimum, and whereby the side frame and parts attached thereto are spring supported. This has the advantage of reducing the impacts and shocks imparted to the side frame, increasing the life and durability of the same, and also avoids the wear and damage to parts, such as brake rigging, supported from the side frame, which might be caused by impact and vibration.

Another further object is to provide a truck construction wherein resilient and friction and/or resilient means are disposed in series.

A different object is to provide spring assemblies wherein there is provided softer cushioning action under light loads, while at the same time providing the necessary stiffness and capacity under heavy loads, these features being combined also to provide a construction which reduces any tendency toward synchronous vibration of the springs.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 4 is a sectional elevation taken substantially in the plane as indicated by the line 4—4 of Figure 2.

Figure 1:
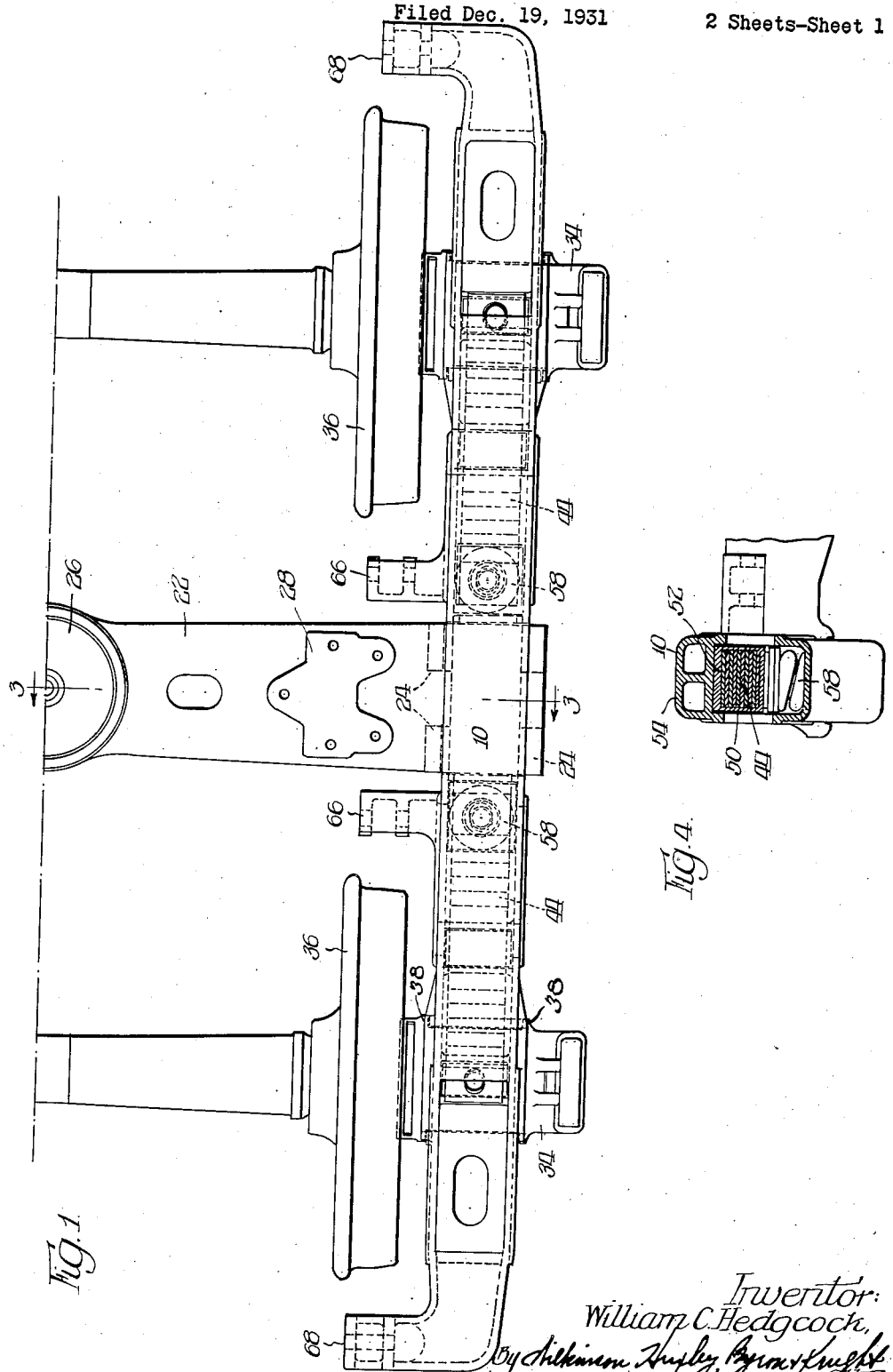
Figure 1 is a fragmentary top plan view of a form of truck construction embodying the invention.
Figure 2:
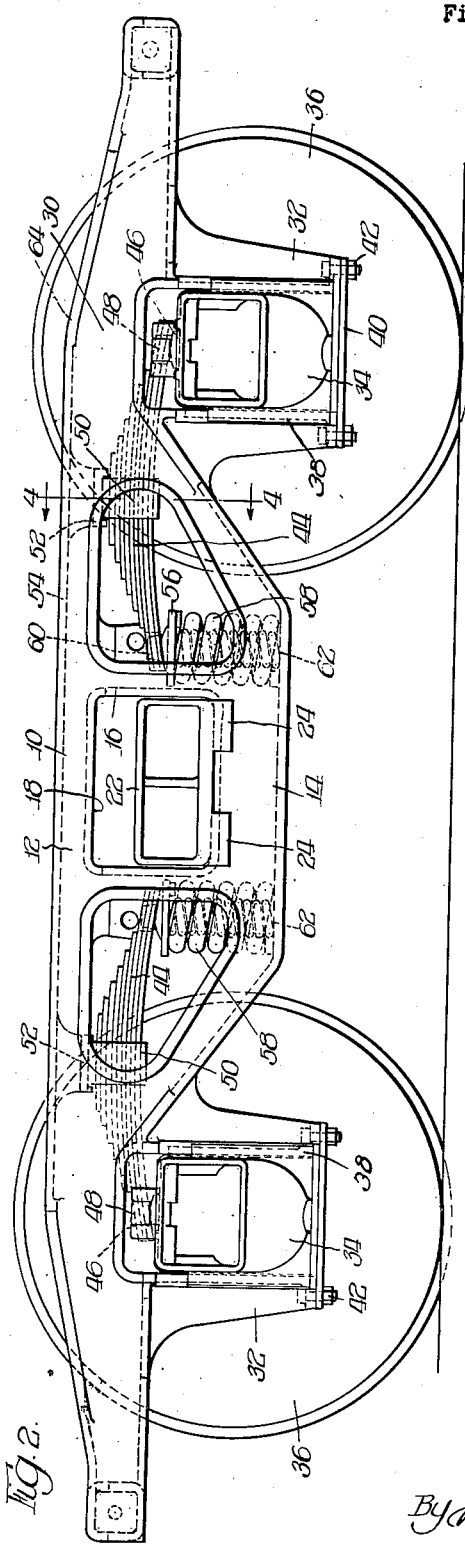
Figure 2 is a side elevation of the truck construction shown in Figure 1.
Figure 3:
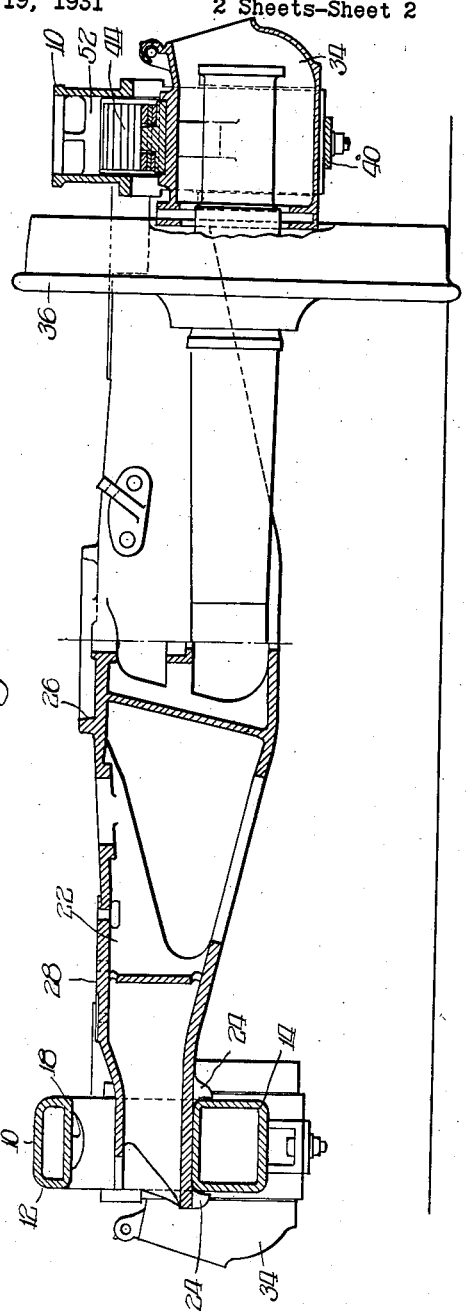
Figure 3 is a transverse sectional elevation of the truck construction shown in Figures 1 and 2, the section at the right of the figure being taken through the journal box and side frame in way of the journal box, and the section at the left of the figure being taken substantially in the plane as indicated by the line 3—3 of Figure 1.

In the truck construction illustrated, the side frame 10 is substantially of truss construction, having the compression member 12, the tension member 14 and the spaced integral connecting columns 16 forming, with the tension and compression members, the bolster opening 18. The lower arch bar of the tension member between the columns forms a bolster seat for the transverse bolsters 22. The bolster extends into the bolster openings of the spaced side frames and is provided with the depending lugs 24 adapted to embrace the lower arch bars for maintaining the spaced frames in squared relation to each other. The bolster is provided with the usual center plate 26 and the side bearings 28, and receives the load from the car body and distributes it to the two side frames.

The tension and compression members merge adjacent their ends as at 30 and are provided with the spaced depending pedestal jaws 32 between which the journal boxes 34 are mounted and guided for vertical movements. The journal boxes are of any desired construction or type, and cooperate with the journal ends of the wheel and axle assemblies 36. The journal boxes are provided with the spaced lugs 38 embracing the pedestal jaws for preventing lateral movements of the journal box while permitting vertical movements. The jaws are connected by means of the retainer plate 40 bolted across the lower ends of the jaws as at 42 for preventing dissociation of the journal boxes from the side frames.

The side frame is resiliently supported on the journal boxes by the semi-elliptic leaf spring assemblies 44, said spring assemblies being supported at a single point on the journal boxes through engagement between the outer leg of the leaf spring assemblies and a suitable seat portion 46 provided on the journal box. An upstanding dowel 48 of the seat portion engages in a suitable aperture formed in an outer leg of said leaf spring forming positioning means. The spring band 50 of the leaf spring assembly is positioned in the seat 52 provided on the upper web 54 of the compression member. The inner leg of the leaf spring assembly is supported on the spring cap 56 of the coil spring assembly 58, the spring cap being position on said leaf spring by engagement of the upstanding dowel 60 with a suitable aperture formed in the inner leg of the leaf spring assembly.

The coil spring is seated on the spring seat 62 provided in the lower chord of the tension member adjacent the columns 16, said columns being preferably of U-shape and partially embracing the coil springs. The coil spring assemblies may be of any desired character such as constant pitch, variable pitch, variable diameter, or variable stiffness, such as illustrated in application Serial No. 552,153, filed July 21, 1931. With the construction illustrated both the leaf and coil springs are partially embraced by the side frames being disposed substantially in the plane thereof, and, in order to facilitate assembly, an opening 64 is provided in the upper web of the side frame of the end section adjacent the end of said section.

The side frame is shown with the usual brake hanger brackets 66 disposed between the wheels, and the side frame may be provided with the brake hanger brackets 68 at each end of the frame where clasp brakes are used. It is to be understood, of course, that any form of brake rigging may be provided.

In operation, the journal boxes are guided longitudinally and laterally in the pedestal jaws, but are permitted vertical motion therein to accommodate the truck to track irregularities and spring motion. The leaf spring carries the side frame and transmits load to the journal box, serving as a resilient equalizer so that motion is taken partially by flexure of the leaf spring and partially by motion of the coil spring which serves as a reaction for the load on the journal box. The leaf and coil springs are preferably so proportioned as to have different periods of oscillation whereby they will not have synchronous periods of oscillation.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a car truck, the combination of a side frame having a tension and compression member and spaced column members forming a bolster opening, a bolster supported in said bolster opening, wheel and axle assemblies, journal boxes cooperating with the journal ends of said wheel and axle assemblies, and a leaf spring non-resiliently mounted on each of said journal boxes in substantially vertical alignment with the axles and having an end mounted on resilient means mounted on said side frame, said side frame being mounted on said spring intermediate the ends thereof.

2. In a car truck, the combination of a side frame, said side frame having a portion for supporting a load carrying member, a journal box, a leaf spring disposed between said first named portion and journal box and engaging said side frame intermediate the ends thereof and engaging said journal box, and a coil spring operatively engaging said leaf spring and said side frame.

3. In a car track, the combination of a side frame and a journal box, said side frame having a portion for supporting a load carrying member, a coil spring, a leaf spring disposed between said first named portion and journal box and having three points of connection, one point connecting said leaf spring to said journal box and a second point connecting said leaf spring to said side frame, the third point connecting said leaf spring to said side frame through said coil spring, said coil spring being at the inner end of said leaf spring.

4. In a car truck, the combination of a side frame and a journal box, said side frame having a portion for supporting a load carrying member, a coil spring, a leaf spring disposed between said first named portion and journal box and having three points of connection, one point connecting said leaf spring to said journal box and a second point connecting said leaf spring to said side frame, the third point connecting said leaf spring to said side frame through said coil spring, said second point being between said other points.

5. In a car truck, the combination of a side frame and a journal box, said side frame having a portion for supporting a load carrying member, a coil spring, a leaf spring disposed between said first named portion and journal box and having three points of connection, one point connecting said leaf spring to said journal box and a second point connecting said leaf spring to said side frame, the third point connecting said leaf spring to said side frame through said coil spring, said first point being at the outer end of said leaf spring.

6. In a car truck, the combination of a side frame and a wheel and axle assembly, said side frame having a portion for supporting a load carrying member, a spring disposed between said wheel and axle assembly and said first named portion and supporting said side frame on said wheel and axle assembly through a non-resilient connection at one point, resilient means interposed between said spring and side frame at another point, and a non-resilient connection between said spring and wheel and axle assembly at a third point, said first point being between said other points.

7. In a car truck, the combination of a side frame and a journal box, said side frame having a portion for supporting a load carrying member, a coil spring, a leaf spring disposed between said first named portion and journal box and carried by said journal box adjacent one end thereof and carrying said side frame, said leaf spring having a resilient connection with said side frame at another point through said coil spring.

8. In a car truck, the combination of a side frame, said side frame having a portion for supporting a load carrying member, a journal box, a leaf spring, a spring seat mounted on one end of said leaf spring, and a coil spring interposed between said spring seat and said side frame and between said journal box and said first named portion, said leaf spring engaging said journal box adjacent the other end of said leaf spring.

9. In a car truck, the combination of a side frame, a seat thereon for accommodating a load carrying member, a journal box, a friction assembly disposed adjacent said seat and carried by said journal box and supporting said side frame through a non-resilient connection at one point and through a resilient connection at an adjacent point, the resilient connection being seated on said side frame and disposed below said friction assembly.

10. In a car truck, the combination of a side frame, a seat thereon for accommodating a load carrying member, a journal box, a coil spring, a leaf spring disposed adjacent said seat and carried at an end by said journal box, said leaf spring having a non-resilient connection and a resilient connection with said side frame, said resilient connection being through said coil spring.

11. In a car truck, the combination of a side frame, a seat thereon for accommodating a load carrying member, a journal box, a coil spring, a leaf spring disposed adjacent said seat and carried at an end by said journal box, said leaf spring having a non-resilient connection intermediate the ends of said spring with said side frame and having a resilient connection with said side frame adjacent another end thereof.

12. In a car truck, the combination of a side frame, a seat thereon for accommodating a load carrying member, a journal box, a coil spring, a leaf spring disposed adjacent said seat and carried at an end by said journal box, said leaf spring having a non-resilient connection with said side frame and having a resilient connection with said side frame adjacent another end thereof.

13. In a car truck, the combination of a side frame, a seat thereon for accommodating a load carrying member, a journal box, a leaf spring disposed adjacent said seat and non-resiliently carried at an end by said journal box, said leaf spring having a non-resilient connection and a resilient connection with said side frame, said resilient connection including a coil spring of variable stiffness.

14. In a car truck, the combination of a side frame, a seat thereon for accommodating a load carrying member, a journal box, a leaf spring disposed adjacent said seat and non-resiliently carried at an end by said journal box, said leaf spring having a non-resilient connection and a resilient connection with said side frame, said resilient connection including a coil spring of constant pitch.

15. In a car truck, the combination of a side frame, a seat thereon for accommodating a load carrying member, a journal box, a friction assembly disposed adjacent said seat and carried by said journal box and supporting said side frame through a non-resilient connection at one point and through a resilient connection at an adjacent point, said friction assembly being disposed above said journal box, said resilient connection engaging said side frame and being disposed below said friction assembly.

16. In a car truck, the combination of a side frame having a tension and compression member and spaced column members forming a bolster opening, a bolster supported in said bolster opening, wheel and axle assemblies, journal boxes co-operating with the journal ends of said wheel and axle assemblies, and a leaf spring mounted on each of said journal boxes and having an end mounted on resilient means disposed below said leaf spring and mounted on said side frame, said side frame being mounted on said spring intermediate the ends thereof and having walls embracing said leaf spring and resilient means.

17. A side frame including tension and compression members and integral connecting columns forming a bolster opening, said tension and compression members merging adjacent the ends and being provided with spaced jaws for accommodating a journal box, and seats provided on said tension and compression members for accommodating resilient connections of different character between said journal box and side frame, one of said seats being disposed adjacent the columns.

18. A side frame including tension and compression members and integral connecting columns forming a bolster opening, said tension and compression members merging adjacent the ends and being provided with spaced jaws for accommodating a journal box, and seats provided on said tension and compression members for accommodating resilient connections of different character between said journal box and side frame, one of said seats being disposed so that said columns embrace one of said resilient means.

19. A side frame including tension and compression members and integral connecting columns forming a bolster opening, said tension and compression members merging adjacent the ends and being provided with spaced jaws for accommodating a journal box, and seats provided on said side frame embraced by the walls thereof for accommodating resilient connections of different character between said journal box and side frame.

20. In a truck, the combination of a side frame, spaced journal boxes, spring seats on said side frame between said journal boxes, a leaf spring mounted on each of said seats and engaging said journal boxes outwardly of said seats, means resiliently mounting said leaf spring on said side frame and a load carrying member supported on said side frame intermediate said leaf springs.

WILLIAM C. HEDGCOCK.